US008842685B2

(12) United States Patent
Um et al.

(10) Patent No.: US 8,842,685 B2
(45) Date of Patent: Sep. 23, 2014

(54) MOBILE MULTICAST SYSTEM FOR SUPPORTING NETWORK-BASED MOBILITY AND METHOD THEREOF

(75) Inventors: Tai-Won Um, Seoul (KR); Jong-Wook Nam, Gongju-si (KR); Kyeongseob Cho, Daejeon (KR); Kyounghee Lee, Daejeon (KR); Hyun-Woo Lee, Daejeon (KR); Won Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 120 days.

(21) Appl. No.: 13/518,180

(22) PCT Filed: Oct. 22, 2010

(86) PCT No.: PCT/KR2010/007277
§ 371 (c)(1),
(2), (4) Date: Jun. 21, 2012

(87) PCT Pub. No.: WO2011/078474
PCT Pub. Date: Jun. 30, 2011

(65) Prior Publication Data
US 2012/0269111 A1    Oct. 25, 2012

(30) Foreign Application Priority Data
Dec. 21, 2009   (KR) .................. 10-2009-0128532

(51) Int. Cl.
*H04L 12/28*   (2006.01)
*H04L 12/761*  (2013.01)
*H04L 12/18*   (2006.01)
*H04W 76/00*   (2009.01)
*H04W 8/18*    (2009.01)
*H04W 8/08*    (2009.01)

(52) U.S. Cl.
CPC ............. *H04L 12/189* (2013.01); *H04W 8/186* (2013.01); *H04L 45/16* (2013.01); *H04W 8/082* (2013.01); *H04W 76/002* (2013.01)
USPC ........................... 370/401; 370/312; 370/432

(58) Field of Classification Search
CPC ......... H04W 80/04; H04W 8/26; H04W 8/02; H04W 8/12
USPC .................. 370/312, 338, 432, 349, 401, 352
See application file for complete search history.

(56) References Cited

U.S. PATENT DOCUMENTS 7,339,903 B2 * 3/2008 O'Neill ......................... 370/313
2007/0053358 A1  3/2007 Aaltonen
2009/0036152 A1  2/2009 Janneteau et al.

FOREIGN PATENT DOCUMENTS

EP          1959637 A1   8/2008
KR     1020050075627 A   7/2005

(Continued)

OTHER PUBLICATIONS

Wang Jiansheng and Cao Yewen, A Novel Mobile Multicast Protocol in IPv6 Networks, 5 pages, Shandong University, Jinan, China, May 23, 2009.

(Continued)

*Primary Examiner* — Chandrahas Patel
(74) *Attorney, Agent, or Firm* — William Park & Associates Patent Ltd.

(57) ABSTRACT

A method includes transferring a general query message to managers of a mobility control server in response to receiving, from a router, the general query message for detecting a mobile node that requested to receive multicast data; storing, in a multicast mapping table, an address of the mobile node that requested to receive the multicast data when a membership report message of the mobile node is received from at least one of the managers and transferring the membership report message to the router; and forming a tunnel between the router and a manager that transfers the membership report message.

12 Claims, 6 Drawing Sheets

(56) References Cited

FOREIGN PATENT DOCUMENTS

| KR | 100711829 B1 | 4/2007 |
|---|---|---|
| KR | 1020090060925 A | 6/2009 |
| WO | 03017703 A1 | 2/2003 |

OTHER PUBLICATIONS

Hitoshi Asaeda, Pierrick Seite, Jinwei Xia, PMI Pv6 Extensions for Multicast, Mar. 8, 2009, 25 pages, Multimob group.

Tai-Won Um, Changwoo Yoon, Hyun Woo Lee, Proposal for Mobile Multicast Procedures in Y.MMC, Telecommunication Standardization Sector, Jan. 2011, 3 pages, International Telecommunication Union.

Tai-Won Um, Changwoo Yoon, Hyun Woo Lee, Proposal for Multicast Scenarios in NGN Mobility Environment, Telecommunication Standardization Sector, Jan. 2011, 3 pages, International Telecommunication Union, Republic of Korea.

Tai-Won Um, Hyun Woo Lee, Proposal for mobile multicast procedures based on the unified transport model in Y. MMC, Telecommunication Standardization Sector, Sep. 2011, 3 pages, International Telecommunication Union.

Mobility Management Framework for IP Multicast Communications in Next Generation Networks, Telecommunication Standardization Sector, Mar. 2012, 29 pages, International Telecommunication Union.

* cited by examiner

MOBILE MULTICAST SYSTEM FOR SUPPORTING NETWORK-BASED MOBILITY AND METHOD THEREOF

TECHNICAL FIELD

Exemplary embodiments of the present invention relate to a mobile multicast system and a method thereof; and, more particularly, to a network based mobile multicast system and a method thereof.

BACKGROUND ART

In general, a mobile communication system has been advanced to various forms. Such an advanced mobile supporting communication system has supported diverse types of communication as well as simple voice communication. One of representative mobile communication systems is a mobile telephone system and a wireless local area network (W-LAN) system.

Mobile nodes of such mobile communication systems also have been abruptly advanced to receive not only a one-to-one (1:1) communication service but also a one-to-N (1:N) communication service. For example, the one-to-N communication service may be a multimedia service such as a TV service or a movie service.

Meanwhile, a mobile communication system includes not only mobile nodes capable of supporting a Mobile Internet Protocol (MIP) but also mobile nodes incapable of supporting the MIP. In order to support the MIP, a mobile node must complicated structures because it must support high specification. Therefore, it is difficult to implement all mobile nodes to support a MIP function. Accordingly, a method for supporting a MIP in a network was introduced. As an example thereof, a Proxy Mobile IP (PMIP) scheme was introduced.

The PMIP is a protocol for supporting mobility in a network base without implementing a MIP function in a mobile node. Such a PMIP scheme was developed as a communication protocol with only unicast communication. However, as described above, a PMIP based communication system needs to support not only one to one communication but also one to N communication. Here, the one to N communication is referred as multicast communication. Many studies have been in progress to provide various services such as IPTV by supporting multicast communication in an Internet Engineering Task Force (IETF) which standardizes a PMIP technology for supporting a Multicast service.

DISCLOSURE

Technical Problem

An embodiment of the present invention is directed to a system for providing a multicast service in a PMIP system and a method thereof.

Another embodiment of the present invention is directed to a system for providing a multicast service without implementing an additional function to a mobile node and a method thereof.

Another embodiment of the present invention is directed to a system for providing a multicast service with a signaling load reduced in a network and a method thereof.

Another embodiment of the present invention is directed to a system for improving network bandwidth usability for a multicast service, and a method thereof.

Another embodiment of the present invention is directed to a system for quickly providing a multicast service, and a method thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with an embodiment of the present invention, a method for providing a multicast service to a mobile node from a mobility control server supporting a network based mobility includes transferring a general query message to managers connected at a lower level of the mobility control server when the general query message for detecting a mobile node that wants to receive multicast data is received from a router, storing an address of a mobile node that wants to receive the multicast data and multicast information at a multicast mapping table when receiving a membership report message of the mobile node from at least one manager, and transferring the membership report message to the router, and forming a tunnel between the router and a manager that transfers the membership report message.

In accordance with another embodiment, a method for providing multicast data to a mobile node from a manager connected to a mobility control server through an IP core network includes receiving a general query message for detecting a mobile node that wants to receive multicast data from the mobility control server and transferring the received general query message to mobile nodes through an access point, receiving a membership report message from at least one mobile node that wants to receive the multicast data among mobile nodes connected to the access point and transferring the received membership report message to the mobility control server, setting up an interface of a packet received at the at least one mobile node at a binding table when a tunnel between the at least one mobile node to the multicast router is formed in response to the membership report message from the mobility control server, and transferring a multicast packet received at the at least one mobile node through the interface when the at least one mobile node receives the multicast packet from the multicast router through the tunnel.

In accordance with another embodiment of the present invention, a method for providing multicast data to a mobile node from a router connected to a mobility control server through an IP core network includes transmitting a general query message for detecting a mobile node that wants to receive the multicast data from the mobility control server at a predetermined time interval, forming a tunnel between a mobile node that wants to receive the multicast data and a manager that communicates with the mobile node when a membership report message of the mobile node and information about the manager is received from the mobility control server, and transmitting the multicast data to the mobile node through the tunnel.

In accordance with another embodiment of the present invention, a mobile multicast system supporting network based mobility includes access points configured to communicate with mobile nodes having no mobility supporting function in an access network through a wireless channel and to obtain and provide a 2 layer (L2) address of a mobile node, managers configured to control a handover process of each mobile node included in the access points, and to transmit a multicast packet to the mobile node, a router configured to receive multicast data through a network and to transmit the multicast packet to a mobile node that wants to receive the multicast data, and a mobility control server configured to obtain location information of a mobile node from the managers, to determine whether a mobile node is registered for a multicast service or not by transmitting a query message for determining whether multicast data is received or not to the managers when the query message is received from the router, to form a tunnel between the router and a manager that transmits a membership report message when the membership report message for registering the multicast service is received.

Advantageous Effects

A multicast supporting method of a network based mobility support system in accordance with an embodiment to the present invention can effectively provide a multicast service such as IPTV in real time by supporting multicast based on high speed mobility and limited bandwidth in an IP based mobile network environment.

BEST MODE

Figure 1:
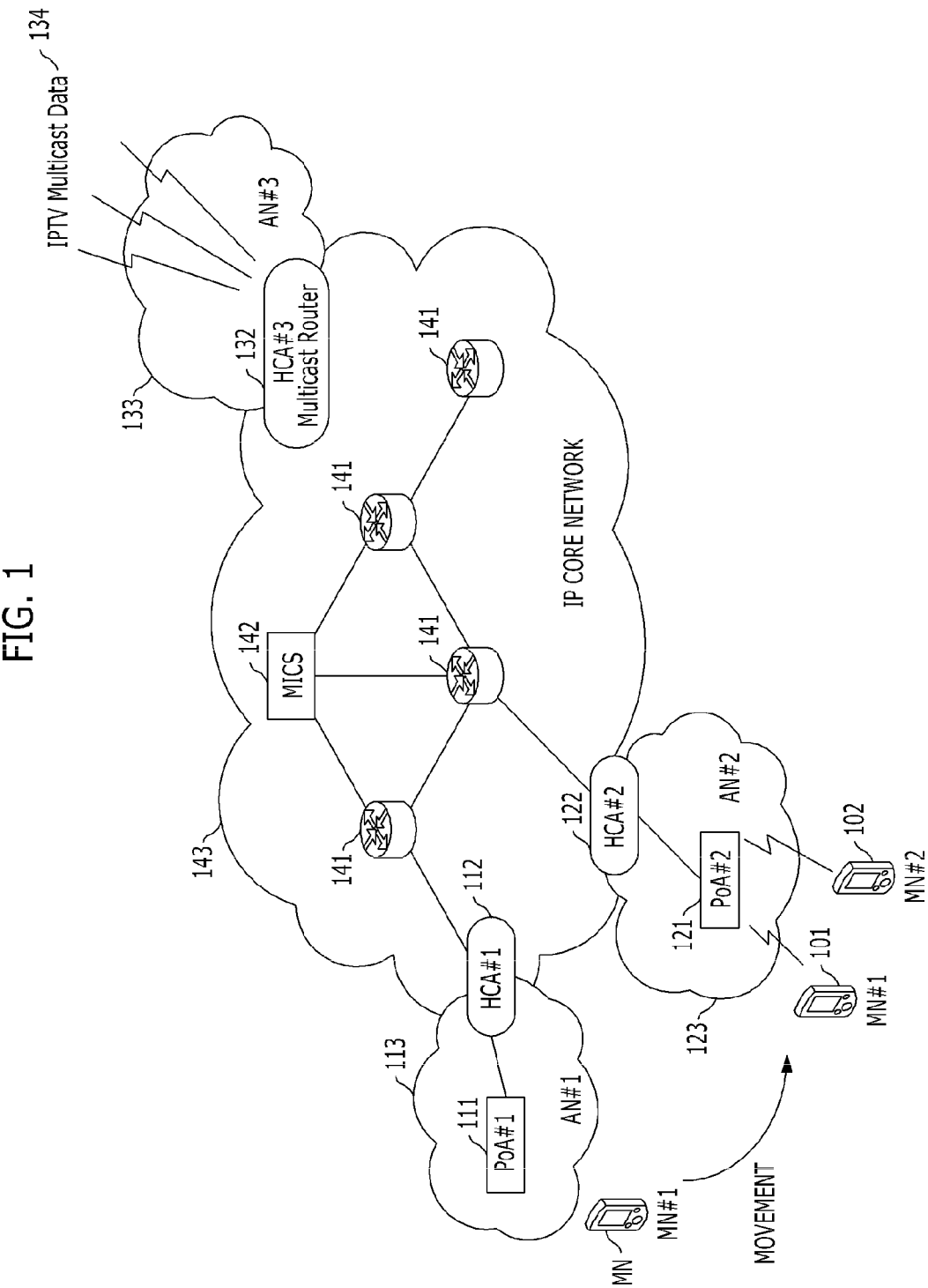
FIG. 1 is a diagram illustrating a network environment of a network based mobile communication system for describing a multicast supporting method in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

At first, an embodiment of the present invention will be briefly described.

In order to support mobility of a multicast receiving mobile node in a PMIP domain environment, a Local Mobility Anchor (LMA) forwards packets to mobile nodes (MN) in a multicast group through a Mobile Access Gateway (MAG). The LMA must support a multicast routing protocol to forward the packets. Further, the MAG manages multicast group membership states of mobile nodes accessing the MAG. The MAG detects movements of mobile nodes and registers binding information to the LMA.

In the embodiment of the present invention, a Handover Control Agent (HCA) and a Mobility Information Control Server (MICS) are required to support mobility of a multicast receiving mobile node in an IP based network environment. The handover control agent (HCA) transfers a multicast packet to mobile nodes connected to the handover control agent (HCA) and performs a multicast router function. The mobility information control server (MICS) processes only mobility or multicast related signaling messages. Further, a multicast router regularly transmits a general query message. Then, a mobile node registers to a multicast group by transmitting a membership report message to the multicast router. After transmitting, the mobile node can transmit and receive a multicast packet bi-directionally through a tunnel formed between the multicast router and a handover control agent (HCA) of the mobile node. Parameters required to form the tunnel are transferred to the multicast router and the handover control agent (HCA) of the mobile node from the mobility information control server (MICS).

FIG. 1 is a diagram illustrating a network environment for describing a multicast supporting method of a network based mobility supporting system in accordance with an embodiment of the present invention. Hereinafter, an operation of an overall system and each constituent element thereof in accordance with an embodiment of the present invention will be described with reference to FIG. 1.

The network based mobility support system in accordance with an embodiment of the present invention includes first and second mobile nodes (MN) 101 and 102. The first and second mobile nodes (MN) 101 and 102 may be a wireless communication mobile node that communicates with a base station through a wireless channel. In an embodiment of the present invention, it is assumed that the first and second mobile nodes 101 and 102 do not have a MIP function.

The network based mobile supporting system in accordance with an embodiment of the present invention further includes first and second Point of attachment 111 and 121. The first and second PoAs 111 and 121 include access networks (AN) 113 and 123 as a communication area for communicating with the mobile nodes through a wireless channel. The first and second PoAs 111 and 121 communicate with at least one mobile node. The PoAs 111, 121, and 132 sense the first and second mobile nodes 101 and 102 moving to a new area and support a fast handover process based on L2 trigger. The PoAs 111 and 121 are connected to handover control agents (HCA) 112 and 122 for controlling the handover of the mobile node. Therefore, the PoAs obtain a Layer 2 (L2) address from a message provide from a mobile node when at least one mobile node not supporting mobility is accessed.

For example, when the first mobile node (MN#1) 101 requires accessing, the second PoA (PoA#2) 121 obtains a L2 address of the first mobile node (MN#1) 101 from information provided from the first mobile node (MN#1) 101 through an access procedure of a predetermined protocol. Then, the second PoA (PoA#2) 121 transmits the obtained L2 address of the first mobile node (MN#1) 101 to a second handover control agent (HCA#2) 122 connected thereto.

Then, the second handover control agent (HCA#2) 122 receives the layer 2 (L2) address of the first mobile node (MN#1) 101 and maintains and manages the received L2 address. Further, the second handover control agent (HCA#2) 122 transmits the L2 address of the first mobile node (MN#1) 101 and a layer 3 (L3) address of the second handover control agent (HCA#2) to a mobility information control server (MICS) 142. Moreover, the second handover control agent (HCA#2) 122 sustains and manages information about permanent addresses (PA) and L2 addresses of mobile nodes in a lower management area and interfaces to a PoA 121 performing an AP function at the AN where mobile nodes are located.

The second handover control agent (HCA#2) encapsulates a multicast packet to be provided to the first and second mobile nodes 101 and 102. Here, the multicast packet is a packet simultaneously provided to a plurality of mobile nodes. The multicast packet may be IPTV data or movie data. Therefore, the handover control agents (HCAs) 112, 122, and 132 connect various access networks with a core network and transmit and receive multicast signaling messages for the first and second mobile nodes 101 and 102. Therefore, the handover control agents (HCAs) 112, 122, and 132 manage tunneling interfaces by mapping the L3 address of a handover control agent (HCA) where a multicast router for transmitting a multicast data to the mobile nodes 101 and 102 to a L3 address thereof.

Although the second handover control agent (HCA#2) was described above, the first handover control agent (HCA#1) performs the same operation discussed above. Since the third handover control agent (HCA#3) 132 performs a router operation for transmitting a multicast packet, the third handover control agent (HCA#3) 132 will be described in more detail.

The handover control agents (HCAs) 112 and 122 may be located at the same position of the PoAs 111 and 121 or may be implemented with the PoAs as one system. Further, the handover control agents (HCAs) 112 and 122 may be implemented into the PoAs 111 and 121 as an additional function.

An IP core network 132 includes the handover control agents (HCAs) 112, 122, and 132 at an edge thereof. The handover control agents (HCAs) 112, 122, and 132 may perform a router function as described above. The handover control agents (HCAs) 112, 122, and 132 may communicate with the mobility information control server (MICS) 132 through routers 141 located inside the IP core network 143.

The mobility information control server (MICS) 142 manages the L2 addresses and the permanent addresses (PA) of the mobile nodes 101 and 102 and a L3 address of the handover control agent (HCA) 112 that manages the mobile nodes 101 and 102. Further, the mobility information control server (MICS) 142 provides information required for forming a tunnel of transmitting a multicast packet to each mobile node (MN) to each handover control agent (HCA) and relays a multicast signaling message from the multicast router.

Figure 2:
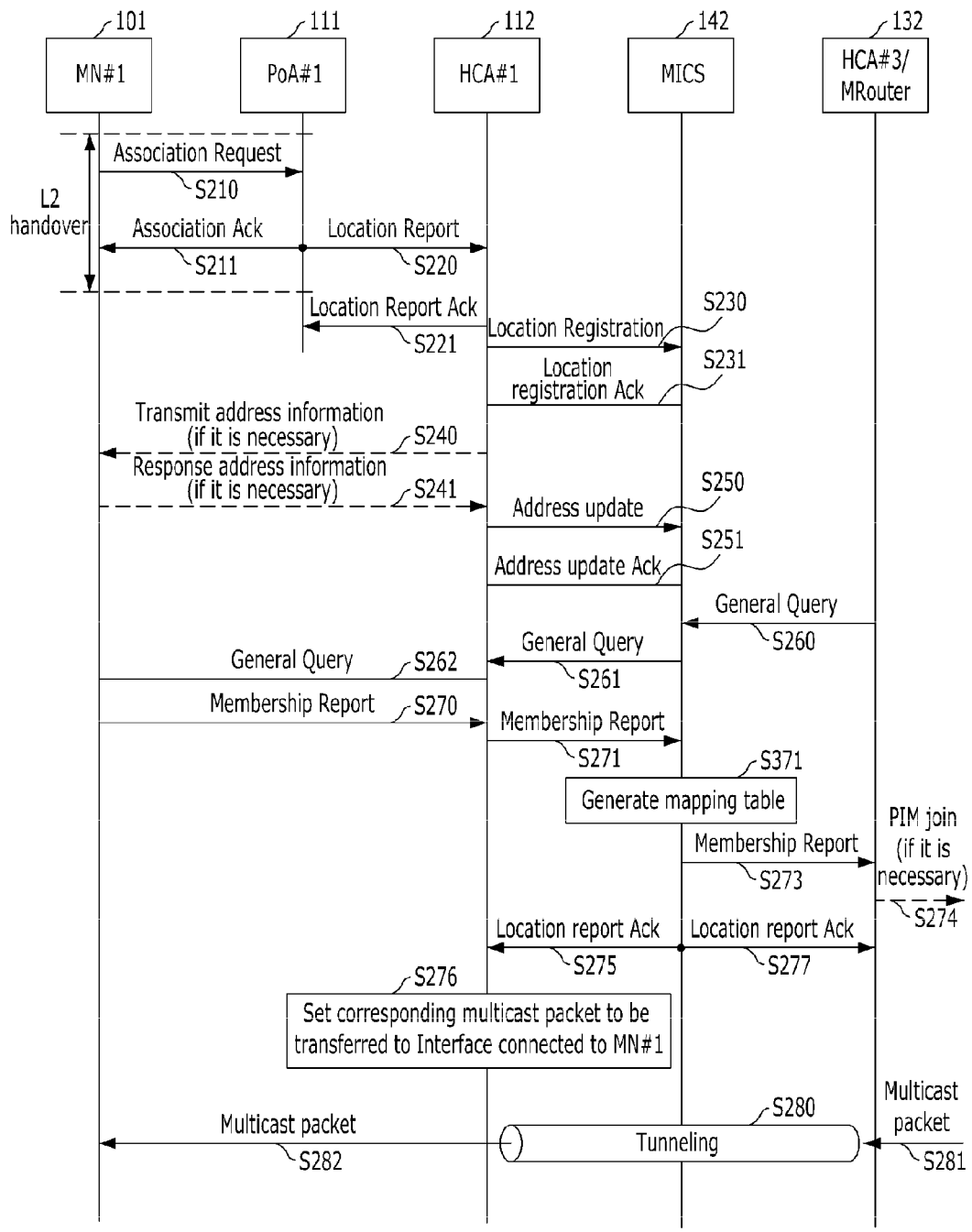
FIG. 2 is a flowchart illustrating a method for registering a multicast service after initial registration of a mobile node in accordance with an embodiment of the present invention.

FIG. 2 is a flowchart illustrating a method for registering a multicast service after initial registration of a mobile node in accordance with an embodiment of the present invention. Hereinafter, an operation of FIG. 2 will be described using the constituent elements shown in FIG. 1.

The method for registering a multicast service in accordance with an embodiment will be described based on a first mobile node (MN#1) 101 among the constituent elements of FIG. 1. At first, a procedure that the first mobile node (MN#1) 101 initially registers at a first PoA (PoA#1) 111 will be described. In FIG. 2, the first mobile node (MN#1) 101 newly registers at the first PoA (PoA#1) 111 when the first mobile node (MN#1) 101 enters into the first PoA (PoA#1) 111 from other PoA or when the first mobile node (MN#1) 101 is just turned on.

At step S210, the first mobile node (MN#1) 101 transmits an association request message to the second PoA (PoA#2) 111 to perform a L2 handoff process when the first mobile node (MN#1) 101 turns on in an area of a first access network (AN#1) 113 or enters into the area of the first access network (AN#1) 113 from other access network. At step S211, the second PoA (PoA#2) 111 receives the association request message from the first mobile node (MN#1) 101 obtains a L2 address of the first mobile node (MN#1) 101 through a L2 trigger function. At step S220, the first PoA (PoA#1) 111 transmits the L2 address of the first mobile node (MN#1) to a first handover control agent (HCA#1) 112 where the first PoA (PoA#1) 111 belongs to using a location reporting message. Such steps S210 and 211 are referred as a L2 handover procedure.

At step S221, the first handover control agent (HCA#1) 121 transmits a location reporting ACK message to the first PoA (PoA#1) 111 and records the L2 address of the first mobile node (MN#1) 101 at a binding table in the first handover control agent (HCA#1) 112. Using the recorded L2 address of the binding table, the first handover control agent (HCA#1) 112 can transmit a packet to the first mobile node (MN#1) 101. At step S230, the first handover control agent (HCA#1) 112 informs the mobility information control server (MICS) 142 of the L2 address of the first mobile node (MN#1) 101 and the L3 address of the first handover control agent (HCA#1) 112 using a location registration message received from the first PoA (PoA#1) 111. Then, the mobility information control server (MICS) 142 receives the location registration message, generates a record for the first mobile node (MN#1) 101 at a binding table, and stores the information included in the location registration message in the generated record. At step S231, the mobility information control server (MICS) 142 transmits a location registration ACK message to the first handover control agent (HCA#1) 111.

If the first handover control agent (HCA#1) 112 can obtain a permanent address (PA) of the first PoA (PoA#1) 111 and the permanent address (PA) is required in a system during the association request and response steps S210 and S211, the first handover control agent (HCA#1) 112 may transmit the permanent address (PA) of the first PoA (PoA#1) 111 with the L2 address of the first mobile node (MN#1) 101 at step S240.

When the first handover control agent (HCA#1) 112 informs the permanent address (PA) of the first PoA (PoA#1) 111 to the first mobile node (MN#1) 101, the first mobile node (MN#1) 101 stores the permanent address (PA) of the first PoA (PoA#1) 111, generates an address information ACK message, and transmits the generated address information ACK message to the first handover control agent (HCA#1) 112. Through such a procedure, the first mobile node (MN#1) 101 can obtain the permanent address (PA) of the first PoA (PoA#1) 111. The steps S240 and S241 may be performed only when those steps are necessary. Such steps S240 and S241 may be unnecessary to implement the embodiment of the present invention.

The first mobile node (MN#1) 101 performs the initial registration procedure as described above. After the initial registration procedure, the first mobile node (MN#1) 101 may receive multicast data in accordance with an embodiment of the present invention as well as unicast data.

At step S250, the first handover control agent (HCA#1) 112 generates an address update message and transmits the generated address update message to the mobility information control server (MICS) 142 when a predetermined condition is satisfied, for example, when a new mobile node (MN) is joined or when a predetermined time is passed. Such an address update message may include information about joining to or leaving from the first handover control agent (HCA#1) 112. Further, such an address update message may include information about current joined mobile nodes (MNs). When the mobility information control server (MICS) 142 receives the address update message, the mobility information control server (MICS) 142 may regularly update a binding table for managing information about mobile nodes managed by the first handover control agent (HCA#1) 112. After updating the information about mobile nodes (MNs) using the address update message, the mobility information control server (MICS) 142 generates an address update ACK message and transmits the generated address update ACK message to the first handover control agent (HCA#1) 112 to inform the address update completion at step S251.

Hereinafter, a method for transmitting multicast data at a mobile node after completing the initial registration procedure or the address update procedure in accordance with an embodiment of the present invention will be described. Throughout the specification, a term "multicast data" is equivalent to a multicast packet. The multicast data means data that is transmitted by a multicast service. That is, the multicast data is provided as a form of a packet. Such a packet is referred as a multicast packet. Hereinafter, a multicast data, a multicast packet, a multicast service, a multicast service data, and a multicast service packet may be used as the same meaning.

As described above, a third handover control agent (HCA#3) 132 includes an Access Point (AP) function for transmitting multicast data as a multicast packet as well as a multicast router function as shown in FIG. 1. Such a third handover control agent (HCA#3) 132 must determine mobile nodes who join to a multicast group and want to receive the multicast data to transmit the multicast data as the multicast packet. Therefore, at step S260, the third handover control agent (HCA#3) 132 transmits a general query message to the mobility information control server (MICS) 142 to determine the mobile nodes for receiving the multicast data. Such a general query message may be regularly transmitted at a predetermined interval. The general query message includes information about a multicast service. For example, the general query message may include information about provided programs when a type of a multicast packet is an IPTV data. The general query message may include information about a movie when a type of a multicast packet is a movie data.

At step S261, the mobility information control server (MICS) 142 receives the general query message and transfers the general query message to handover control agents (HCAs) joined to the mobility information control server (MICS) 142. At step S262, the handover control agents (HCAs) joined to the mobility information control server (MICS) 142 transmit a general query message to mobile nodes when the handover control agents (HCAs) receive the general query message from the mobility information control server (MICS) 142 as shown in FIG. 2. Although the first handover control agent (HCA#1) 112 transmits a general query message through the first PoA (PoA#1) 111, FIG. 2 illustrates the first handover control agent (HCA#1) 112 directly transmits the general query message for convenience. Hereinafter, when a PoA connected to a handover control agent (HCA) does not perform a specific function, it will be described that a handover control agent (HCA) and a mobile node (MN) directly transmits signals, packets, or messages to a handover control agent (HCA) or a MN.

When one of mobile nodes (MN) receiving the general query message wants to receive a multicast service, the mobile node (MN) must respond to the general equerry message.

When the first mobile node (MN#1) 101 wants to receive a multicast service as shown in FIG. 2, the first mobile node (MN#1) 101 generates and transmits a membership report message to the first handover control agent (HCA#1) 112 at step S270. Then, the first handover control agent (HCA#1) 112 transmits the membership report message to the mobility information control server (MICS) 142. The first handover control agent (HCA#1) may transmit an IP address of the first mobile node (MN#1) 101, a L2 address of the first mobile node (MN#1) 101, a multicast group address, an IP address of the first handover control agent (HCA#1) 112, and an IP address of the third handover control agent (HCA#3) 132 with the membership report message. Here, the third handover control agent (HCA#3) 132 is a handover control agent providing a multicast service. If the mobility information control server (MICS) 142 is already aware of those addresses, the first handover control agent (HCA#1) 112 may transmit only a membership report message.

Figure 6:
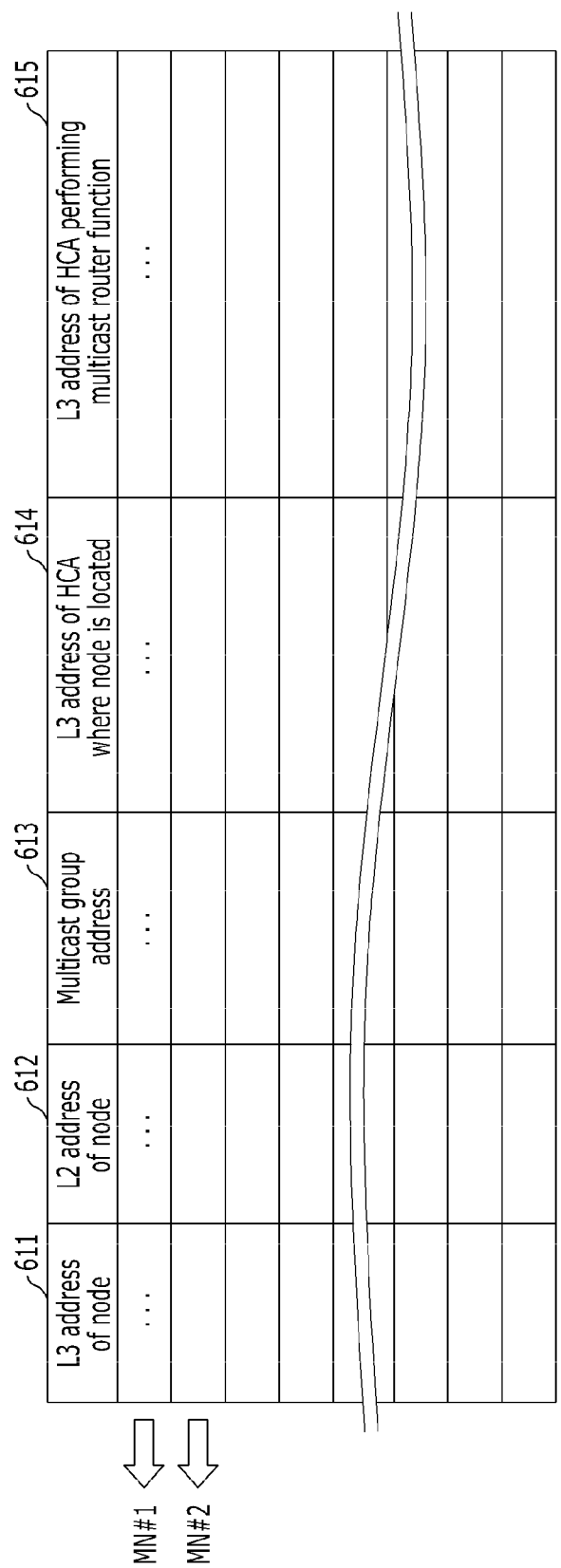
FIG. 6 is a diagram illustrating a multicast mapping table in accordance with an embodiment of the present invention.

At step S272, the mobility information control server (MICS) 142 receives the membership report message and generates a multicast mapping table using the above described addresses. The multicast mapping table in accordance with an embodiment of the present invention is shown in FIG. 6. FIG. 6 illustrates a multicast mapping table in accordance with an embodiment of the present invention. The multicast mapping table in accordance with an embodiment of the present invention will be described with reference to FIG. 6.

As shown in FIG. 6, the multicast mapping table in accordance with an embodiment of the present invention includes a plurality of fields for storing information about mobile nodes. For example, regarding the first mobile node (MN#1) 101, the multicast mapping table in accordance with an embodiment of the present invention includes a field 611 for a L3 address of a first mobile node (MN#1) 101, a field 612 for a L2 address of a first mobile node (MN#1) 101, a field 613 for a L2 address of a multicast group for receiving a multicast packet with the first mobile node (MN#1) 101, a field 614 for a L3 address of a handover control agent (HCA) where the first mobile node (MN#1) 101 is located, and a field 615 for a L3 address of a handover control agent (HCA) performing a multicast router function.

After generating the multicast mapping table described above, the mobility information control server (MICS) 142 transmits the membership report message to the third handover control agent (HCA#3) 132 at step S273. Here, the third handover control agent (HCA#3) performs a multicast router function.

When the third handover control agent (HCA#3) receives the membership report message, the third handover control agent (HCA#3) generates a Protocol Independent Multicast (PIM) join message like the step S274 and transfers the generated PIM join message to an apparatus for transmitting data, for example, an IPTV service providing server.

Meanwhile, after transmitting the membership report message at step S273, the mobility information control server (MICS) 142 transmits a location information ACK message to the first handover control agent (HCA#1) 112 at step S275 and transmits the location information ACK message to the third handover control agent (HCA#3) 132 at the same time at step S277. The location information ACK message transmitted by the mobility information control server (MICS) 142 at the step S275 includes an L3 address and a multicast group address of the first mobile node (MN#1) 101 for forming a tunnel between the first handover control agent (HCA#1) 112 and the third handover control agent (HCA#3) 132. The location information ACK message transmitted by the mobility information control server (MICS) 142 at the step S277 also includes a L3 address of the first handover control agent (HCA#1) 112 and a L3 address of the first mobile node (MN#1) 101 for establishing a tunnel between the first handover control agent (HCA#1) 112 and the third handover control agent (HCA#3) 132.

After the first handover control agent (HCA#1) receives the location information ACK message as described above, a multicast packet forwarding entry is configured on an internal interface using the IP address and the multicast group address of the first mobile node (MN#1) 101 included in the received location information ACK message in order to enable the first mobile node (MN#1) 101 to transfer a multicast packet received from the third handover control agent (HCA#3) 132 to an interface at step S276. Such a multicast packet forwarding entry may be included in a binding table which is a table used when a mobile node (MN) joins to a handover control agent (HCA) as described above. Alternately, the multicast packet forwarding entry may be formed as an entry in an independent table.

At step S280, a tunnel is formed between the first handover control agent (HCA#1) 112 and the third handover control agent (HCA#3) 132 for transferring a multicast packet.

When the third handover control agent (HCA#3) 132 receives a multicast packet from a multicast data providing server at step S281 after forming the tunnel between the first handover control agent (HCA#1) 112 and the third handover control agent (HCA#3) 132, the third handover control agent (HCA#3) 132 transfers the received multicast packet to the first handover control agent (HCA#1) 112 through the tunnel formed at the step S280. Then, the first handover control agent (HCA#1) 112 transmits the multicast packet to the first mobile node (MN#1) 101 based on the multicast packet forwarding entry configured at the step S276. Through the above described steps, the first mobile node (MN#1) 101 can receive multicast data transmitted from a server that transmits multicast data.

Figure 3:
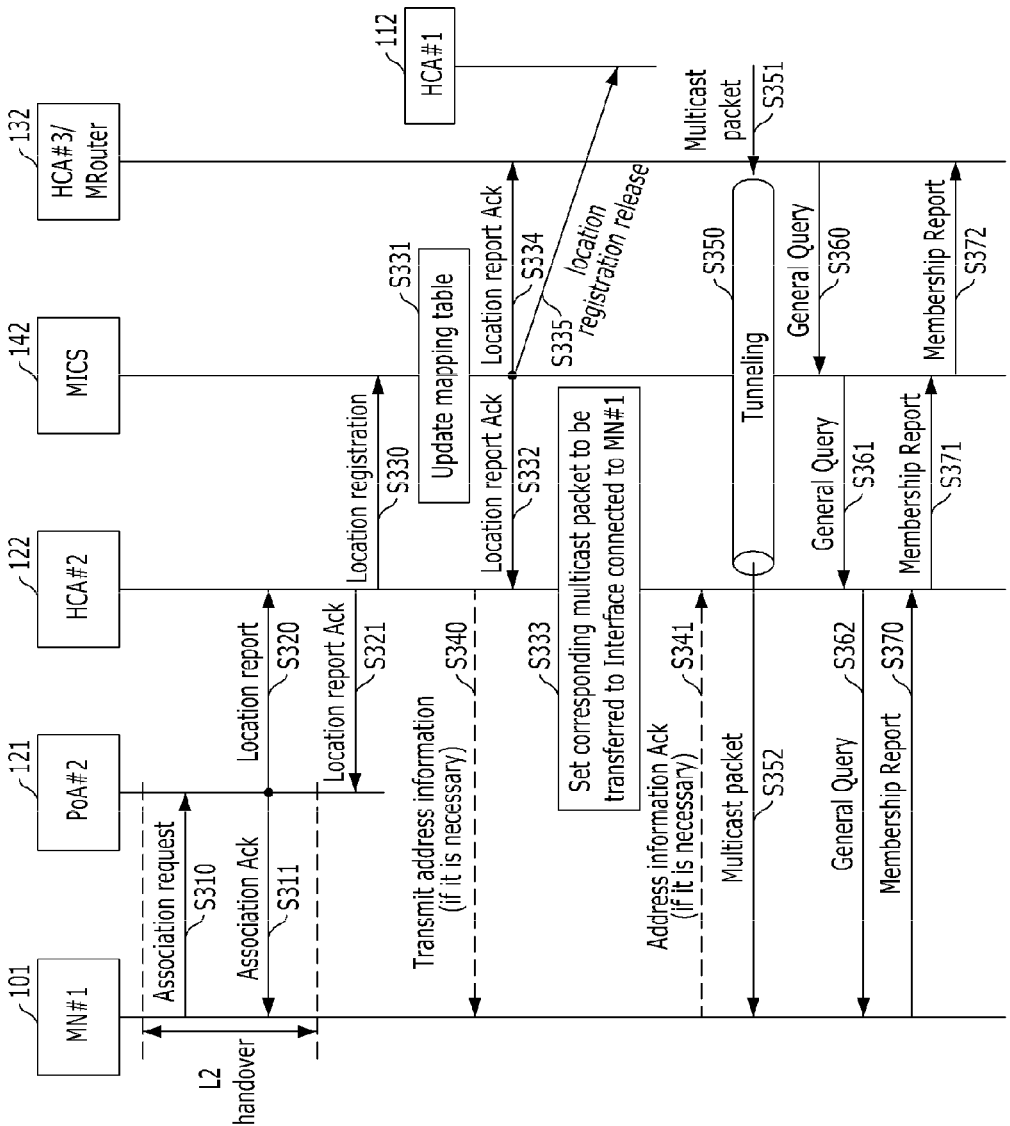
FIG. 3 is a flowchart illustrating a method for continuously processing a multicast service during a handover process of a mobile node (MN) in accordance with an embodiment of the present invention.

FIG. 3 is a flowchart illustrating a method for continuously processing a multicast service during a handover process of a mobile node (MN) in accordance with an embodiment of the present invention.

At first, a handover process of the first mobile node (MN#1) 101 will be described with reference to FIG. 1. A handover process is performed when the first mobile node (MN#1) 101, which is included the first access network (AN#1) 113 through the first PoA (PoA#1) 111 and the first handover control agent (HCA#1) 112, joins to the first PoA (PoA#1) 111 and the first handover control agent (HCA#1) 112 because the first mobile node (MN#1) 101 enters to the second access network (AN#1) 123 from the first access network (AN#1) 122. A method for continuously providing a multicast service during such a handover in accordance with an embodiment of the present invention will be described with reference to FIGS. 1 and 3.

When the first mobile node (MN#1) 101 moves to a new second access network second access network (AN#1) 123, it is required to perform a fast handover process. Accordingly, a L2 handover is performed as described in FIG. 2. The steps S210 and S211 of FIG. 2 are equivalent to steps S310 and S311 of FIG. 3. Accordingly, the detailed description thereof is omitted herein. At step S320, the second PoA (PoA#2) 121 generates and transmits a location report message including a L2 address of the first mobile node (MN#1) 101 to an upper layer thereof such as the second handover control agent (HCA#2) 122 when the L2 handover process is performed because the first mobile node (MN#1) 101 accessing the first PoA (PoA#1) 111 moves.

At step S321, the second handover control agent (HCA#2) 122 receives the location report message, generates a location report ACK message, and transmits the generated location report ACK message to the second PoA (PoA#2) 121. Further, the second handover control agent (HCA#2) 122 registers the L2 address of the first mobile node (MN#1) 101 to a binding table thereof. At step S330, the second handover control agent (HCA#2) 122 transfers a location registration message including a L2 address of the first mobile node (MN#1) 101 and a L3 address of the second handover control agent (HCA#2) 122 to the mobility information control server (MICS) 142.

The mobility information control server (MICS) 142 searches an entry for the first mobile node (MN#1) 101 from the multicast mapping table in the mobility information control server (MICS) 142 using the location registration message received from the second handover control agent (HCA#2) 122. As shown in FIG. 2, the multicast mapping table is not newly generated because it is previously stored when the first mobile node (MN#1) initially registers. The mobility information control server (MICS) 142 only searches the entry of the multicast mapping table. When the multicast mapping table does not include information about the first mobile node (MN#1) 101, a new entry is newly registered at the multicast mapping table. Since the first mobile node (MN#1) 101 moves from the first access network (AN#1) 113 of the first PoA (PoA#1) 111 to the second access network (AN#1) of the second PoA (PoA#2) in FIG. 3, the multicast mapping table must have information about the first mobile node (MN#1) 101.

Therefore, the mobility information control server (MICS) 142 searches the entry of the multicast mapping table for the first mobile node (MN#1) 101 and updates the searched entry at step S331. As described above with reference to FIG. 3, the mobility information control server (MICS) 142 searches and finds the IP address of the first mobile node (MN#1) 101, the L2 address of the first mobile node (MN#1) 101, the multicast group address, the IP address of the first handover control agent (HCA#1) 112, and the IP address of the third handover control agent (HCA#3). Then, the mobility information control server (MICS) 142 updates the handover control agent (HCA) field of the entry with information about the second handover control agent (HCA#2) 122 where the first mobile node (MN#1) 101 currently locates and stores the IP address of the first mobile node (MN#1) 101, the L2 address of the first mobile node (MN#1) 101, the multicast group address, the IP address of the second handover control agent (HCA#2) 122, and the IP address of the third handover control agent (HCA#3) at an entry of the multicast mapping table.

Then, the mobility information control server (MICS) 142 transmits a location information ACK message to the second handover control agent (HCA#2) 122 at step S332 in order to establish a tunnel between the second handover control agent (HCA#2) 122 and the third handover control agent (HCA#3) 132. The location information ACK message includes the L3 address of the first mobile node (MN#1) 101, the multicast group address, and the L3 address of the second handover control agent (HCA#2) 122. Further, the mobility information control server (MICS) 142 transmits a location registration release message to the first handover control agent (HCA#1) 112 at step S335 in order to release a tunneling of the first handover control agent (HCA#1) 112. Through the above described steps, the moving process of the first mobile node (MN#1) 101 is finally completed.

Meanwhile, the second handover control agent (HCA#2) 122 and the third handover control agent (HCA#3) 132 establish a tunnel at step S350 using the messages transmitted in the steps S332 and S334. The completion of the moving process of the first mobile node (MN#1) 101 may be defined as after establishing a tunnel between the second handover control agent (HCA#2) 122 and the third handover control agent (HCA#3) 132.

When the third handover control agent (HCA#3) 132 receives a multicast packet from a multicast data providing server at step S351 after establishing the tunnel between the second handover control agent (HCA#2) 122 and the third handover control agent (HCA#3) 132, the third handover control agent (HCA#3) 132 transmits the multicast packet to the second handover control agent (HCA#2) 122 through the tunnel. At step S352, the second handover control agent (HCA#2) 122 transmits the multicast packet to the first mobile node (MN#1) 101 with reference to the multicast packet forwarding entry on an inner interface. The first mobile node (MN#1) 101 can receive the multicast data transmitted from the multicast data providing server through the above described steps.

Meanwhile, the third handover control agent (HCA#3) 132 including a multicast router function may regularly transmit a general query message to the multicast group in order to check member states. Accordingly, the third handover control agent (HCA#3) 132 regularly transmits a general query message to the mobility information control server (MICS) 142 at a predetermined interval like the step S360 of FIG. 3.

Then, the mobility information control server (MICS) 142 transfers a general query message to handover control agents (HCAs) managed by the mobility information control server (MICS) 142 at step S361. At step S362, the handover control agents (HCAs) accessed the mobility information control server (MICS) 142 receive the general query message and transmit the received general query message to mobile nodes connected to the handover control agents (HCAs).

When a mobile node, that wants to continuously receive multicast data from the third handover control agent (HCA#3) 132 performing a multicast router function, receives the general query message, the mobile node must inform that the mobile node wants to continuously receive the multicast data. For example, when the first mobile node (MN#1) 101 wants to continuously receive the multicast data and receives the general query message, the first mobile node (MN#1) generates a membership report message and transmits the membership report message to the second handover control agent (HCA#2) 122 at step S370.

Then, the second handover control agent (HCA#2) 122 receives the membership report message and transmits the received membership report message to the mobility information control server (MICS) 142 that manages information about a plurality of access networks and connects the access networks at step S371. At step S372, the mobility information control server (MICS) 142 transmits the membership report message to the third handover control agent (HCA#3) 132 in order to enable the third handover control agent (HCA#3) 132 to continuously provide a multicast data to a mobile node that wants to continuously receive the multicast data.

Figure 4:
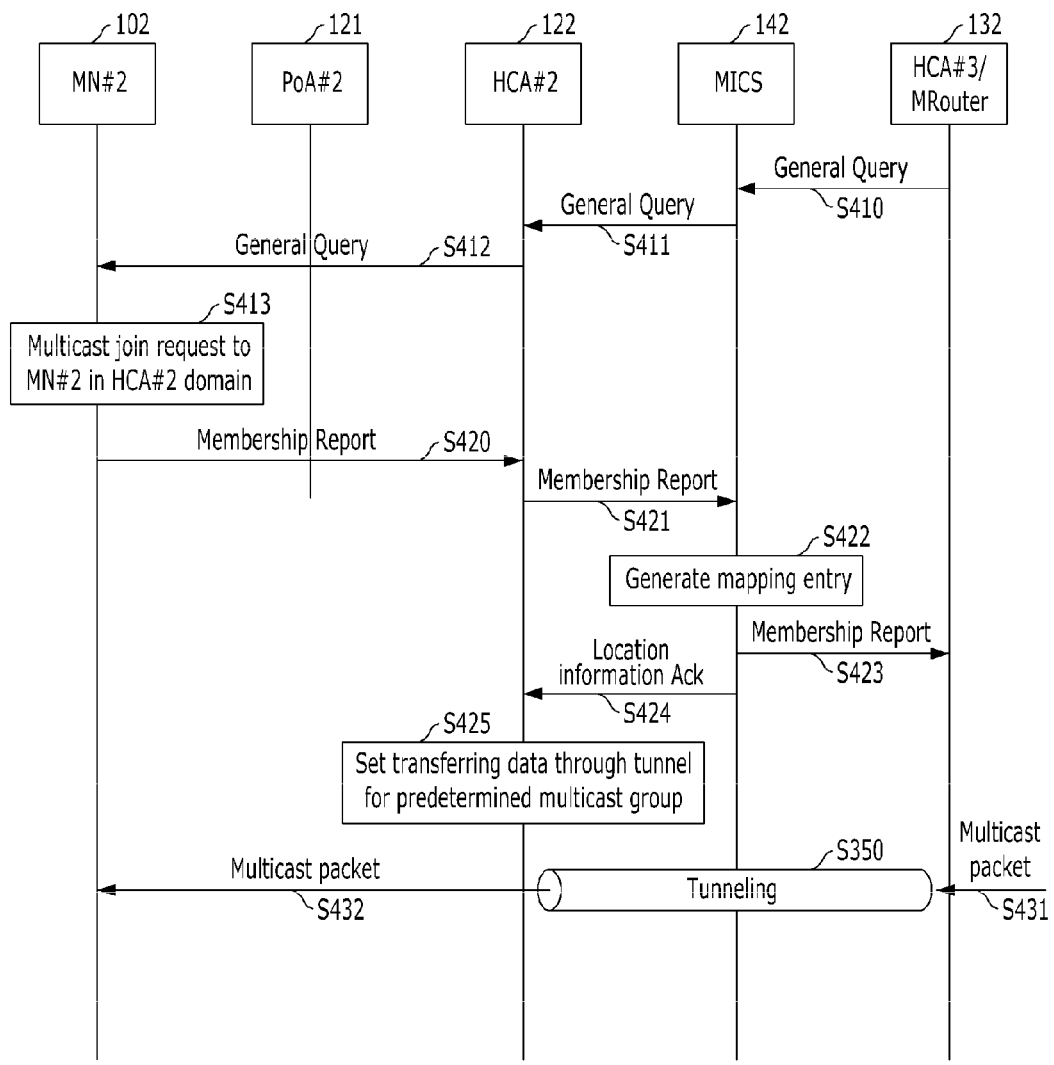
FIG. 4 is a flowchart illustrating a method for additionally registering a multicast service at a new mobile node in accordance with an embodiment of the present invention.

FIG. 4 is a flowchart illustrating a method for additionally registering a multicast service at a new mobile node in accordance with an embodiment of the present invention. Hereinafter, a method for additionally registering a multicast service at a mobile node in accordance with an embodiment of the present invention will be described with reference to FIGS. 1 to 4.

In order to describe the method, it is assumed that the second mobile node (MN#2) 102 is included in the second access network (AN#2) 123, which is an wireless area of the second PoA (PoA#2) 121, and wants to receive a multicast service that the first mobile node (MN#1) 101 receives. Further, it is assumed that the first mobile node (MN#1) 101 already receives a multicast service from the third handover control agent (HCA#3) 132 as shown in FIG. 3.

At step S410, the third handover control agent (HCA#3) 132 performing a multicast router function generates a general query message and transmits the generated general query message to the mobility information control server (MICS) 142 that manages handover control agents (HCAs) in order to regularly check states of mobile nodes receiving the multicast service. At step S411, the mobility information control server (MICS) 142 receives the general query message and transfers the received general query message to the handover control agents (HCAs) that provide the multicast service to mobile nodes. Accordingly, the second handover control agent (HCA#2) 122 regularly receives the general query message from the mobility information control server (MICS) 142 at a predetermined time interval.

At step S412, the second handover control agent (HCA#2) 122 transfers the general query message to the mobile nodes (MNs) communicating with the second PoA (PoA#2) 112 through a wireless channel. Then, not only mobile nodes already receiving the multicast service data but also mobile nodes not receiving the multicast service data receive the general query message. One of mobile nodes not receiving the multicast service data may want to receive the multicast service. For example, a user of the second mobile node (MN#2) 102 may want to receive new multicast service data. When a user want to receive serviced multicast service data by checking a general query message received at the second mobile node (MN#2) 102, the second mobile node (MN#2) 102 sends a multicast service request to a domain of the second handover control agent (HCA#2) 122. Then, the second mobile node (MN#2) 102 generates the membership report message and transmits the generated membership report message to the second handover control agent (HCA#2) 122 at step S420.

When the second handover control agent (HCA#2) 122 receives the membership report message from a new mobile node such as the second mobile node (MN#2) 102, the second handover control agent (HCA#2) 122 transfers the received membership report message to the mobility information control server (MICS) 142 that manages information about a plurality of access networks and connects the access networks at step S421.

When the mobility information control server (MICS) 142 receives the membership report message for the new mobile node such as the second mobile node (MN#2) 102, the mobility information control server (MICS) 142 generates mapping information for the second mobile node (MN#2) 102 at a multicast mapping table included in the mobility information control server (MICS) 142 at step S422. That is, the mobility information control server (MICS) 142 adds mapping information of the L3 address of the second mobile node (MN#2) 102, the L2 address of the second mobile node (MN#2) 102, the multicast group address, the IP address of the second handover control agent (HCA#2) 122, and the L3 address of the third handover control agent (HCA#3) 132 to the multicast mapping table.

At step S423, the mobility information control server (MICS) 142 relays and transfers the membership report message from the second handover control agent (HCA#2) 122 to the third handover control agent (HCA#3) 132. The mobility information control server (MICS) 142 can recognize that a tunnel from the third handover control agent (HCA#3) 132 to the second handover control agent (HCA#2) 122 for a corresponding multicast group is already established. Therefore, the mobility information control server (MICS) 142 transmits a membership message to the third handover control agent (HCA#3) 132 in order to enable the third handover control agent (HCA#3) 132 to transmit multicast data of the second mobile node (MN#2) 102 through the tunnel from the third handover control agent (HCA#3) to the first mobile node (MN#1) 101 of the second handover control agent (HCA#2) data without additionally establishing a tunnel. Further, at step S424, the mobility information control server (MICS) 142 transmits a location information ACK message to the second handover control agent (HCA#2) 122 in order to transmit multicast data to the second mobile node (MN#2) 102 through a tunnel, which is formed to transmit multicast data to the third handover control agent (HCA#3) 132 and the first mobile node (MN#1) 101.

At step S425, the second handover control agent (HCA#2) 122 receives the location information ACK message and forms a forwarding entry at an interface in order to transmit a corresponding multicast data to the second mobile node (MN#2) 102. That is, the second handover control agent (HCA#2) sets up a forwarding entry in order to transmit multicast data to the second mobile node (MN#2) 102 through a tunnel for transmitting multicast data to the first mobile node (MN#1) 101.

Then, a tunnel shown in FIG. 4 becomes a tunnel setup at the step S350 of FIG. 3. Therefore, at step S432, the third handover control agent (HCA#3) 132 receives the multicast data packet to be transmitted to the first mobile node (MN#1) 101 and the second mobile node (MN#2) 102 and transmits the multicast data packet to the second handover control agent (HCA#2) 122 through the tunnel previously formed at the step S350 of FIG. 3. As described above, at step S432, the second handover control agent (HCA#2) 122 receiving the multicast packet can transmit the multicast packet to the second mobile node (MN#2) 102 using the interface forwarding entry, which is formed at the step S425.

Figure 5:
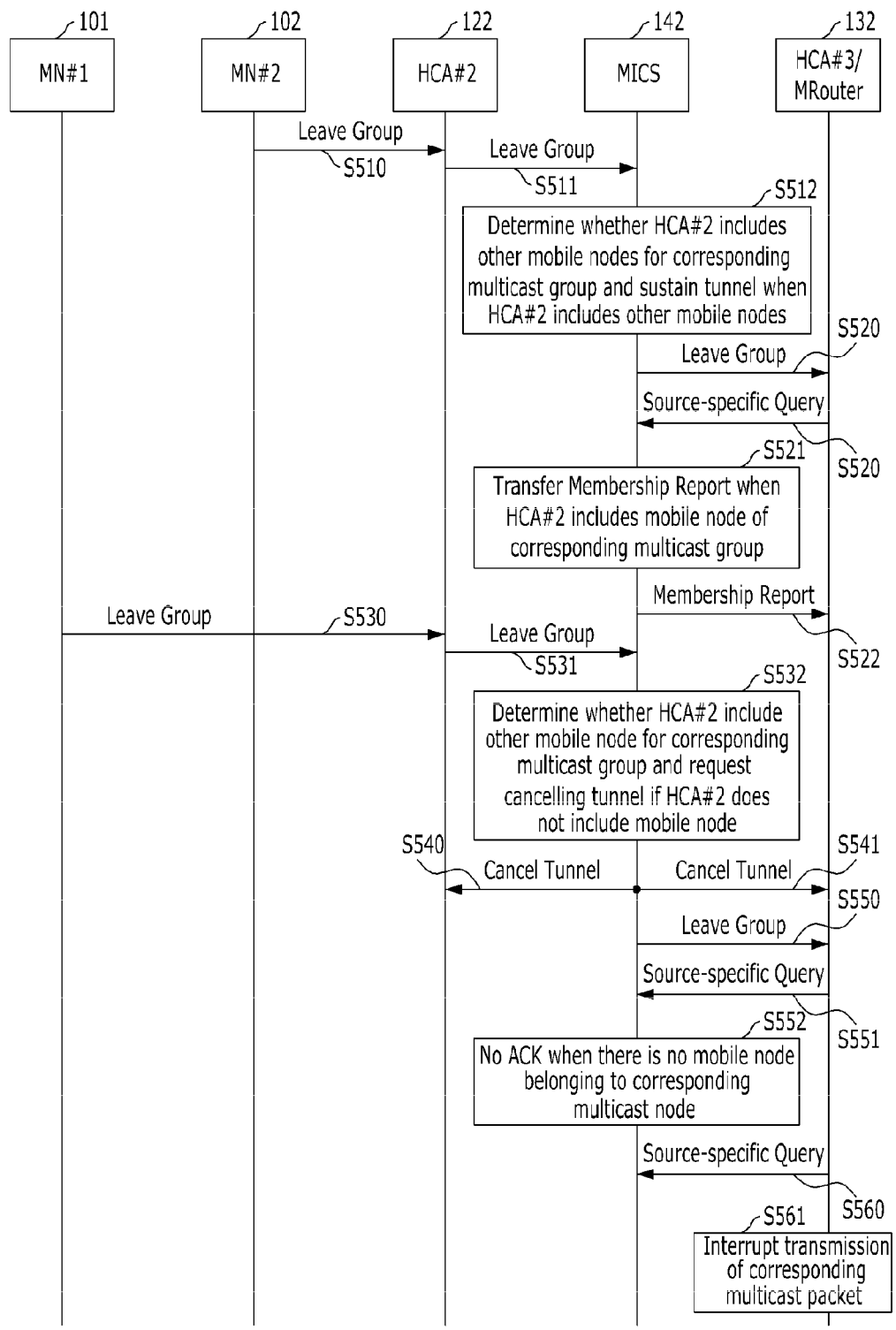
FIG. 5 is a flowchart illustrating a method for leaving a multicast group at a mobile node in accordance with an embodiment of the present invention.

FIG. 5 is a flowchart illustrating a method for leaving a multicast group at a mobile node in accordance with an embodiment of the present invention. Hereinafter, a signal flow and an operation of constituent elements when a mobile node leaves a multicast group in accordance with an embodiment of the present invention will be described with reference to FIGS. 1 and 5.

For convenience to describe, it is assumed that the first mobile node (MN#1) 101 and the second mobile node (MN#2) 102 are presented at a lower level of the second handover control agent (HCA#2) 122. Further, it is assumed that the second handover control agent (HCA#2) 122 receives a multicast packet transmitted from the third handover control agent (HCA#3) 132 and transmits the multicast packet to the first mobile node (MN#1) 101 and the second mobile node (MN#2) 102 through a tunnel formed between the third handover control agent (HCA#3) 132 and the second handover control agent (HCA#2) 122.

In FIG. 5, the first mobile node (MN#1) 101 and the second mobile node (MN#2) 102 receive multicast data packets from the third handover control agent (HCA#3) 132, and then the first mobile node (MN#1) 101 and the second mobile node (MN#2) 102 leave the multicast group in order. When mobile nodes leave a multicast group one-by-one, a system may perform different procedures according whether the multicast group still includes a mobile node receiving a multicast data packet from the third handover control agent (HCA#3) 132 or not.

At first, a method for leaving a multicast group at a mobile node in accordance with an embodiment of the present invention will be described when the mobility information control server (MICS) 142 still includes at least one mobile node receiving a multicast data packet although one of mobile nodes in the mobility information control server (MICS) 142 requests leaving a corresponding multicast group.

When a user of the second mobile node (MN#2) 102 requests cancellation of a multicast service because the user does not want to receive the multicast service any more, the second mobile node (MN#2) 102 generates a leave group request message and transmits the generated leave group request message to the second handover control agent (HCA#2) 122 in order to leave the multicast group at step S510. At step S511, the second handover control agent (HCA#2) 122 transfers the received leave group request message received from the second mobile node (MN#2) to the mobility information control server (MICS) 142.

At step S512, the mobility information control server (MICS) 142 determines whether a corresponding multicast group includes at least one mobile node receiving a multicast packet which belongs to the second handover control agent (HCA#2) 122 or not when the mobility information control server (MICS) 142 receives the leave group request message from the second mobile node (MN#2) 102 through the second handover control agent (HCA#2) 122. When the multicast group includes the mobile node receiving the multicast packet, the mobility information control server (MICS) 142 transfers the leave group request message of the second mobile node (MN#2) 102 to the third handover control agent (HCA#3) 132 because it is required to sustain a tunnel between the third handover control agent (HCA#3) 132 and the second handover control agent (HCA#2) 122 for transferring a multicast data packet.

Such a leave group request message is transferred to the third handover control agent (HCA#3) 132 passing through the second handover control agent (HCA#2) 122 and the mobility information control server (MICS) 132 like a path of transferring a membership report message that is transmitted to the third handover control agent (HCA#3) 132 to receive the multicast service.

Meanwhile, the third handover control agent (HCA#3) 132 receiving the group leave message from the second mobile node (MN#2) 102 generates and transmits a source-specific query message to the mobility information control server (MICS) 142 in order to determine whether a corresponding multicast group still includes at least one mobile node receiving a multicast packet at step S520.

When the mobility information control server (MICS) 142 receives the source-specific query message, the mobility information control server (MICS) 142 determined whether a mobile node included in the corresponding multicast group is present in handover control agents (HCAs) managed by the mobility information control server (MICS) 142 or not. Like the assumption, the mobility information control server (MICS) 142 can be aware that the first mobile node (MN#1) 101 and the second mobile node (MN#2) 102 receive the multicast data packet in the second handover control agent (HCA#2) 122. Therefore, at step S522, the mobility information control server (MICS) 142 generates and transmits a membership report message to the third handover control agent (HCA#3) 132 in order to inform that there is at least a mobile node receiving a multicast packet by responding the source-specific query message received from the third handover control agent (HCA#3) 132.

Although some mobile nodes in the mobility information control server (MICS) 142 leave the multicast group, the mobility information control server (MICS) 142 includes at least one mobile node that receives the multicast packet through a multicast data packet transferring tunnel between the second handover control agent (HCA#2) 122 and the third handover control agent (HCA#3) 132. Therefore, the corresponding tunnel is required to be continuously sustained.

Hereinafter, a method for leaving a multicast group at a mobile node in accordance with an embodiment of the present invention will be described when all of mobile nodes cancel the multicast service.

Among mobile nodes managed under the mobility information control server (MICS) 142, only the first mobile node (MN#1) 101 receives a multicast service provided from the third handover control agent (HCA#3) 132. If a user of the first mobile node (MN#1) 101 does not want to receive the multicast service provided from the third handover control agent (HCA#3) 132, the first mobile node (MN#1) 101 transmits a leave group request message to the second handover control agent (HCA#2) 122 in order to leave a corresponding multicast group. Then, the second handover control agent (HCA#2) 122 transfers the leave group request message to the mobility information control server (MICS) 142.

When the mobility information control server (MICS) 142 receives the leave group request message, the mobility information control server (MICS) 142 determines whether at least one mobile node receiving a multicast service belongs to the second handover control agent (HCA#2) 122 for the corresponding multicast group at step S532. If at least one mobile node receiving the multicast service is present under the second handover control agent (HCA#2) 122, the tunnel is sustained as described above at step S512. However, the first mobile node (MN#1) 101 is the last mobile node receiving the multicast service under the second handover control agent (HCA#2) 122, the mobility information control server (MICS) 142 recognizes that it is not necessary to sustain the tunnel between the third handover control agent (HCA#3) 132 and the mobility information control server (MICS) 142. Therefore, the mobility information control server (MICS) 142 generates a message for requesting cancellation of the tunnel.

At step S540, the mobility information control server (MICS) 142 transmits the tunnel cancellation message to the second handover control agent (HCA#2) 122 and the third handover control agent (HCA#3) 132.

When the second handover control agent (HCA#2) 122 and the third handover control agent (HCA#3) 132 receives the tunnel cancellation message, the second handover control agent (HCA#2) 122 and the third handover control agent (HCA#3) 132 cancel the tunnel.

At step S550, the mobility information control server (MICS) 142 transmits the leave group request message to the third handover control agent (HCA#3) 132. As described above, the leave group request message is transferred to the third handover control agent (HCA#3) 132 passing through the second handover control agent (HCA#2) 122 and the mobility information control server (MICS) 132 like the membership report message transmitted from a mobile node to the third handover control agent (HCA#3) 132 to receive the multicast service.

When the third handover control agent (HCA#3) 132 receives a multicast group leave signaling message from the MU#1 101, the third handover control agent (HCA#3) 312 generates and transmits a source-specific query message to the mobility information control server (MICS) 142 in order to determine whether the mobile node receives a multicast data packet or not at step S551. Then, the mobility information control server (MICS) 142 receives the source-specific query message and determines whether a mobile node in a corresponding multicast group is included among handover control agents (HCAs) managed by the mobility information control server (MICS) 142. For example, the mobility information control server (MICS) 142 determines whether the mobile node is included in the second handover control agent (HCA#2) 122 in FIG. 5. If no mobile node is included in a corresponding multicast group of the second handover control agent (HCA#2) 122, the mobility information control server (MICS) 142 sends no ACK at step S552.

The third handover control agent (HCA#3) 132 transmitting a multicast packet retransmits a source-specific query message to the mobility information control server (MICS) 142 predetermined times such as two or three times at a predetermined time interval at step S560. When no ACK is received from the mobility information control server (MICS) 142 although the source-specific query message is retransmitted predetermined times, the third handover control agent (HCA#3) 132 interrupts transmission of a corresponding multicast packet.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

The invention claimed is:

1. A method comprising:
    transferring a general query message to managers of a mobility control server in response to receiving, from a router, the general query message for detecting a mobile node that requested to receive multicast data;
    storing, in a multicast mapping table, an address of the mobile node that requested to receive the multicast data when a membership report message of the mobile node is received from at least one of the managers and transferring the membership report message to the router;
    forming a tunnel between the router and a manager that transfers the membership report message;
    in response to receiving, from a second manager, a location registration message of a mobile node receiving the multicast data:
        updating the multicast mapping table;
        controlling cancellation of the tunnel between the manager and the router; and
        forming a tunnel between the router and the second manager.

2. The method of claim 1, further comprising:
    generating an entry for a second mobile node at the multicast mapping table when receiving a membership join message from the second mobile node present at the manager, wherein the membership join message is a message for receiving the multicast data;
    transmitting a location information ACK message to the manager to transmit the multicast data to the second mobile node through a previously formed tunnel; and
    transferring a membership report message of the second mobile node, which is transferred through the manager, to the router.

3. The method of claim 1, further comprising:
    determining whether the manager includes at least one mobile node receiving the multicast data when a leave group request message is received from a mobile node through the manager, wherein the leave group request message is a request for interrupting reception of the multicast data; and transmitting the leave group request message of the mobile node to the router when at least one mobile node is receiving the multicast data based on the determination result.

4. The method of claim 1, further comprising:

determining whether the manager includes at least one mobile node receiving the multicast data when a leave group request message is received from a mobile node through the manager, wherein the leave group request message is a request for stopping reception of the multicast data;

transmitting the leave group request message of the mobile node to the router when no mobile node is receiving the multicast data through the manager based on the determination result; and controlling cancellation of the tunnel between the router and the manager.

5. The method of claim 1, wherein the location registration is received from the second manager because the mobile node moves to another access network.

6. The method of claim 1, wherein the multicast mapping table includes mapping information of a 3 layer address of the mobile node, a layer 2 (L2) address of the mobile node, a multicast group address, a layer 3 (L3) address of the manager, a layer 3 (L3) address of the router.

7. A method comprising:

receiving a general query message for detecting a mobile node that requested to receive multicast data from a mobility control server and transferring the received general query message to mobile nodes through an access point, wherein the mobile nodes include a first mobile node;

receiving a membership report message from the first mobile node that requested to receive the multicast data and transferring the received membership report message to the mobility control server;

setting up an interface of a packet received at the first mobile node at a binding table when a tunnel between the first mobile node and the multicast router is formed in response to the membership report message from the mobility control server; and transferring the multicast packet received at the first mobile node through the interface when the at least one mobile node receives the multicast packet from the multicast router through the tunnel;

when the mobility control server requests cancellation of the tunnel between the at least one mobile node and the multicast router, deleting the interface of the first node from the binding table and cancelling the tunnel between the multicast router and the at least one mobile node.

8. A method comprising:

transmitting a general query message for detecting a mobile node that requested to receive the multicast data from the mobility control server at a predetermined time interval;

when a membership report message of the mobile node and information about the manager is received from the mobility control server, forming a tunnel between the mobile node that requested to receive the multicast data and a manager that communicates with the mobile node;

transmitting the multicast data to the mobile node through the tunnel;

when a location information ACK message is received from the mobility control server while transmitting the multicast data to the mobile node through the router, cancelling the tunnel between the mobile node and the router, wherein the location information ACK message is a message requesting changing the manager of the mobile node; and forming a tunnel between the mobile node and a second manager indicated by the mobility control server and transmitting the multicast data to the mobile node through the tunnel.

9. The method of claim 8, further comprising:

cancelling the tunnel to the manager when the mobility control server requests cancellation of the tunnel to the manager;

generating a source-specific query message when the leave group request message is received after cancelling the tunnel, and transmitting the generated source-specific query message to the mobility control server at a predetermined time interval in order to detect a mobile node that wants to receive the multicast data; and interrupting transmitting the multicast data when receiving no acknowledgement from the mobility control server after transmitting the source-specific query message predetermined times.

10. A mobile multicast system comprising:

access points configured to communicate with mobile nodes having no mobility supporting function in an access network through a wireless channel and to obtain and provide a 2 layer (L2) address of a mobile node;

managers configured to control a handover process of each mobile node associated with the access points and to transmit a multicast packet to the mobile node;

a router configured to receive multicast data through a network and to transmit the multicast packet to a mobile node that requested to receive the multicast data; and a mobility control server configured to
obtain location information of a mobile node from the managers;
determine whether a mobile node is registered for a multicast service or not by transmitting a query message for determining whether multicast data is received or not to the managers when the query message is received from the router;
form a tunnel between the router and a manager that transmits a membership report message when the membership report message for registering the multicast service is received;
add information about a second mobile node at a multicast mapping table when the membership report message is received from the second mobile node when a tunnel is previously formed between a manager of the second mobile node and the router to transmit the multicast packet; and
control transmission of the multicast packet to the second mobile node through the tunnel between the manager of the second mobile node and the router.

11. The mobile multicast system of claim 10, wherein the router is configured to:

generate a general query message for detecting a mobile node that requested to receive the multicast data and regularly transmit the generated general query message to the mobility control server;

cancel a tunnel to at least one manager when a request for cancellation of the tunnel to the at least one manager is received from the mobility control server;

when a leave group request message is received, generate a source-specific query message and transmit the generated source-specific query message predetermined times at a predetermined interval; and interrupt transmission of the multicast packet when no acknowledgement is received from the mobility control server.

12. The mobile multicast system of claim 10, wherein the multicast mapping table includes information about a layer 3 (L3) address of the mobile node, a layer 2 (L2) address of the mobile node, a multicast group address, a layer 3 (L3) address of the manager, and a layer 3 (L3) address of the router.

* * * * *